US010990843B2

(12) United States Patent
Lin et al.

(10) Patent No.: US 10,990,843 B2
(45) Date of Patent: Apr. 27, 2021

(54) METHOD AND ELECTRONIC DEVICE FOR ENHANCING EFFICIENCY OF SEARCHING FOR REGIONS OF INTEREST IN A VIRTUAL ENVIRONMENT

(71) Applicants: National Taiwan University, Taipei (TW); MEDIATEK INC., Hsin-Chu (TW)

(72) Inventors: Yung-Ta Lin, Taipei (TW); Yi-Chi Liao, Taipei (TW); Shan-Yuan Teng, Taipei (TW); Yi-Ju Chung, Taipei (TW); Li-Wei Chan, Taipei (TW); Bing-Yu Chen, Taipei (TW)

(73) Assignees: National Taiwan University, Taipei (TW); Mediatek Inc., Hsin-Chu (TW)

( * ) Notice: Subject to any disclaimer, the term of this patent is extended or adjusted under 35 U.S.C. 154(b) by 343 days.

(21) Appl. No.: 16/012,582

(22) Filed: Jun. 19, 2018

(65) Prior Publication Data
US 2019/0279015 A1    Sep. 12, 2019

(30) Foreign Application Priority Data

Mar. 6, 2018   (TW) ................................ 107107458

(51) Int. Cl.
| | |
|---|---|
| *G06K 9/32* | (2006.01) |
| *H04N 5/45* | (2011.01) |
| *G06T 7/50* | (2017.01) |
| *G06T 7/70* | (2017.01) |
| *G06T 3/60* | (2006.01) |
| *G06T 7/13* | (2017.01) |
| *G06T 19/00* | (2011.01) |
| *G06F 3/048* | (2013.01) |

(52) U.S. Cl.
CPC ........... *G06K 9/3233* (2013.01); *G06F 3/048* (2013.01); *G06T 3/60* (2013.01); *G06T 7/13* (2017.01); *G06T 7/50* (2017.01); *G06T 7/70* (2017.01); *G06T 19/00* (2013.01); *H04N 5/45* (2013.01)

(58) Field of Classification Search
CPC .. G06K 9/3233; G06K 9/00671; G06T 19/00; G06T 7/50; G06T 7/70; G06T 3/60; G06T 7/13; G06T 11/60; G06F 3/048; G06F 3/011; H04N 5/45
USPC ......................................................... 382/173
See application file for complete search history.

(56) References Cited

U.S. PATENT DOCUMENTS

2018/0288354 A1*  10/2018  Anderson ........... A63F 13/5378

OTHER PUBLICATIONS

Gustafson, Sean G., and Pourang P. Irani. "Comparing visualizations for tracking off-screen moving targets." CHI'07 Extended Abstracts on Human Factors in Computing Systems. 2007. (Year: 2007).*

(Continued)

*Primary Examiner* — Amandeep Saini
(74) *Attorney, Agent, or Firm* — Muncy, Geissler, Olds & Lowe, P.C.

(57) ABSTRACT

A method and an electronic device for enhancing efficiency of searching for a region of interest in a virtual environment are provided. The virtual environment includes a visible scene and an invisible scene. A picture-in-picture (PIP) is displayed in the visible scene as a directional guidance or distance hint related to the region of interest in the invisible scene, thereby saving time and enhancing efficiency of searching for the region of interest.

8 Claims, 6 Drawing Sheets

(56) References Cited

OTHER PUBLICATIONS

Baudisch, P. and R. Rosenboltz. "Halo: a technique for visualizing off-screen locations. CHI 2003." ACM Conference on Human Factors in Computing Systems, CHI Letters. Vol. 5. No. 1. 2003. (Year: 2003).*

Yung-Ta Lin, et al, "Outside-In: Visualizing Out-of-Sight Regions-of-Interest in a 360 Video Using Spatial Picture-in-Picture Previews," *Association for Computing Machinery*, Oct. 22-25, 2017, 11 pages.

* cited by examiner

# METHOD AND ELECTRONIC DEVICE FOR ENHANCING EFFICIENCY OF SEARCHING FOR REGIONS OF INTEREST IN A VIRTUAL ENVIRONMENT

BACKGROUND

1. Technical Field

The present disclosure relates to technologies for enhancing efficiency of searching for regions of interest in a virtual environment, and, more particularly, to a method and an electronic device that present a region of interest of an invisible scene as a picture-in-picture (PIP) in a visible scene so as to enhance efficiency of searching for the region of interest in a virtual environment.

2. Description of Related Art

In recent years, 360-degree panoramic videos are becoming increasingly popular. Particularly, they can provide a user with immersive visual experiences when being applied in the fields of mobile and virtual reality.

Further, 360-degree panoramic videos can present full scene content of virtual reality. However, limited by the user' visual field and the size of a display of an electronic device such as an electronic device with a touch screen or a head-mounted display device, the user can only see portions of the contents of virtual reality.

Although such a viewing mode brings relatively natural visual experiences to general users who browse without any subject limitation, it is not convenient for users who want to search for objects of interest such as extraterrestrials, balloons, cats, dogs, airplanes and idol singers, or regions of interest in virtual reality.

Conventionally, a user can operate an electronic device to search for objects of interest or regions of interest in virtual reality. For example, the user can make a gesture on a touch screen to operate an electronic device, or move his head to make a tilting or turning operation when he wears a head-mounted display device.

Such a method is convenient for the user if regions of interest are in the visual field of the user. But if the regions of interest are not in the visual field of the user, the user cannot know in advance how much time he will spend searching for them. The reason is that the user does not know in which direction or how far away the regions of interest are.

As such, in a 360-degree panoramic video, to search for regions of interest that are not in the visual field of the user will adversely affect visual experiences of the user in virtual reality and even cause the user to miss some important events such as appearance of other more interesting virtual objects in the virtual reality.

Therefore, how to overcome the above-described drawbacks has become critical.

SUMMARY

In view of the above-described drawbacks, the present disclosure provides a method and an electronic device for enhancing efficiency of searching for a region of interest in virtual reality (a virtual environment). In an embodiment, the region of interest is presented as a picture-in-picture (PIP) in a visible scene so as to save time for the user to search for the region of interest.

The present disclosure also provides a method for enhancing efficiency of searching for a region of interest in a virtual environment, wherein the virtual environment is comprised of a visible scene and an invisible scene. The method comprises the steps of: (1) locating a position of the region of interest in the invisible scene and a position of a center of the visible scene; and (2) displaying the region of interest as a PIP of the visible scene at an intersection of a line connecting the position of the region of interest and the position of the center of the visible scene and a boundary of the visible scene.

In an embodiment, the position of the region of interest is a center-of-mass coordinate of the region of interest.

In an embodiment, the method further comprises projecting the visible scene and the PIP on a display device through a projecting means.

In an embodiment, the projecting means is selected from the group consisting of equirectangular projection, cube mapping and equi-angular cubemapping.

In an embodiment, the method further comprises rotating the PIP around a center thereof to generate a rotated picture such that the rotated picture has an outer edge facing the region of interest and an inner edge facing the center of the visible scene.

In an embodiment, the method further comprises fixing the outer edge of the rotated picture and tilting the rotated picture by a tilting angle $\Phi$ along a Z-axis in a three-dimensional space to generate a simulation picture.

In an embodiment, the tilting angle is varied based on the distance between the region of interest and the center of the visible scene.

In an embodiment, a maximum angle of the tilting angle is 105 degrees and a minimum angle of the tilting angle is 0 degree.

The present disclosure provides another method for enhancing efficiency of searching for a region of interest in a virtual environment, wherein the virtual environment is comprised of a visible scene and an invisible scene. The method comprises: (1) locating a position of the region of interest in the invisible scene and a position of a center of the visible scene; and (2) displaying a guiding symbol at an intersection of a line connecting the position of the region of interest and the position of the center of the visible scene and a boundary of the visible scene, wherein the guiding symbol points to the region of interest.

In an embodiment, the guiding symbol is an arrow.

In an embodiment, the distance of the region of interest from the center of the visible scene is indicated by a length, a width, an area or a shape of the arrow.

In an embodiment, the longer the arrow is, the greater the distance between the region of interest and the center of the visible scene is, and the shorter the arrow is, the less the distance between the region of interest and the center of the visible scene is.

The present disclosure provides a further method for enhancing efficiency of searching for regions of interest in a virtual environment, wherein the virtual environment is comprised of a visible scene and an invisible scene. The method comprises the steps of: (1) calculating a first distance between a first region of interest in the invisible scene and a center of the visible scene and calculating a second distance between a second region of interest in the invisible scene and the center of the visible scene, wherein the first region of interest and the second region of interest correspond to a first PIP and a second PIP in the visible scene, respectively, and the second PIP partially overlaps with the first PIP, and wherein the first distance is greater than the second distance; and (2) based on the first distance and the second distance, using linear interpolation to find a position between the center of the visible scene and the first PIP for displaying the second PIP.

In an embodiment, the linear interpolation of step (2) is based on an equation pip_near=pos_center+(pip_far−pos_center)×dist_near/dist_far, wherein pip_near represents a position for displaying the second PIP, pip_far represents a position of the first PIP, pos_center represents the center of the visible scene, dist_near represents the second distance, and dist_far represents the first distance.

The present disclosure further provides an electronic device for enhancing efficiency of searching for a region of interest in a virtual environment, which comprises: a storage unit for storing computer readable program codes; and a processor executing the computer readable program codes to implement a method for enhancing efficiency of searching for a region of interest in a virtual environment.

It should be noted that the subject matter described above can be implemented as a computer-controlled device, a computer program, a computer system, or an artifact such as a computer readable storage medium.

The above and other features and advantages of the present disclosure will become apparent from the following detailed description taken in conjunction with the accompanying drawings. The description is illustrative and not intended to limit the present disclosure.

DETAILED DESCRIPTION OF EMBODIMENTS

The following illustrative embodiments are provided to illustrate the disclosure of the present disclosure, these and other advantages and effects can be apparent to those in the art after reading this specification.

It should be noted that all the drawings are not intended to limit the present disclosure. Various modifications and variations can be made without departing from the spirit of the present disclosure.

Further, some or all operations and/or equivalent operations of the disclosed methods or processes can be performed by executing computer readable instructions on a computer storage medium. Computer readable instructions refer to routines, application programs, application modules, programs modules, programs, components, data structures, algorithms and so on. Computer readable instructions can be implemented on various system configurations, including a single-processor or multiprocessor system, a minicomputer, a mainframe computer, a personal computer, a palmtop computing device, a programmable consumer electronic device based on a microprocessor, or a combination thereof.

Therefore, it should be understood that the logical operations described herein are implemented as a sequence of acts implemented by a computer or program modules running on a computing system and/or as interconnected machine logic circuits or circuit modules within the computing system. The implementation is a matter of choice dependent on the performance and other requirements of the computing system. Therefore, the logical operations described herein are referred to variously as states, operations, structural devices, acts or modules. Such operations, structural devices, acts and modules can be implemented in software, firmware, special purpose digital logic or any combination thereof.

Figure 1:
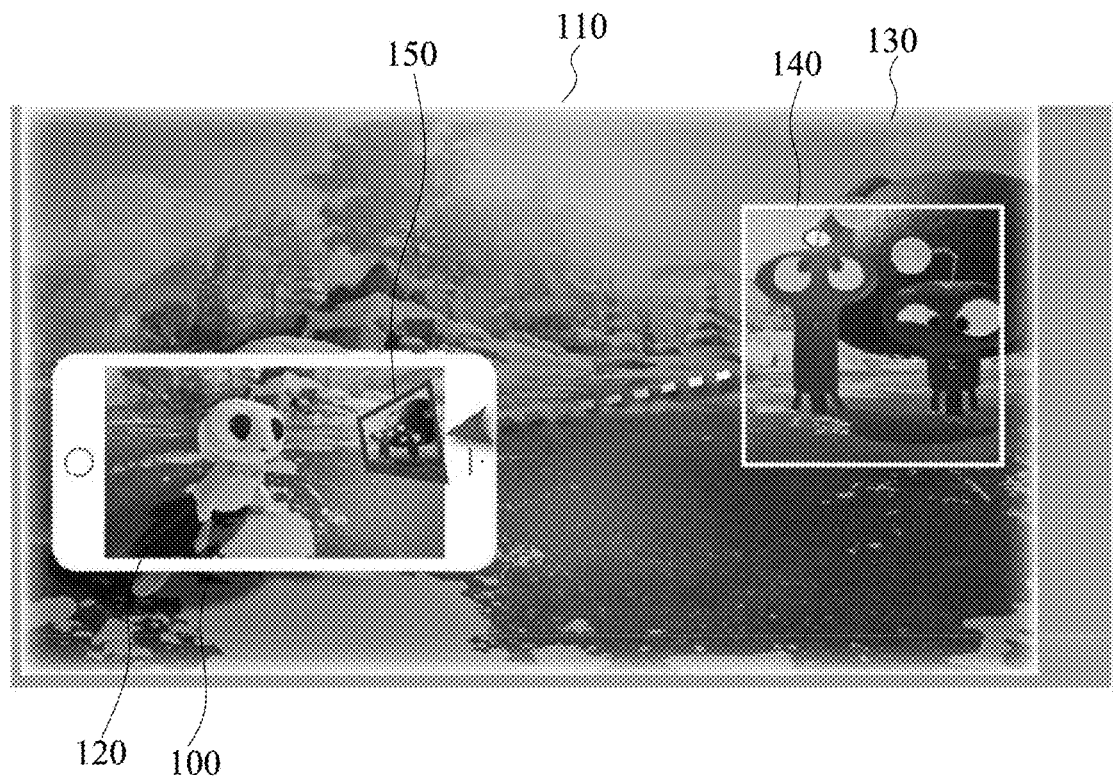
FIG. 1 is a schematic diagram showing presentation of a region of interest as a picture-in-picture (PIP) in a visible scene on a mobile device for enhancing efficiency of searching for the region of interest according to the present disclosure.

The present disclosure provides a method for enhancing efficiency of searching for regions of interest in a virtual environment. FIG. 1 is a schematic diagram showing presentation of a region of interest as a picture-in-picture (PIP) in a visible scene on a mobile device for enhancing efficiency of searching for the region of interest according to the present disclosure.

As shown in FIG. 1, when the user uses a mobile device 100 to experience a virtual environment 110 consisting of a visible scene 120 and an invisible scene 130 and a region 140 of interest such as an extraterrestrial, a balloon, a cat, a dog, an airplane or an idol singer is in the invisible scene 130 of the virtual environment 110, the present disclosure can present the region 140 of interest of the invisible scene 130 as a picture-in-picture (PIP) 150 in the visible scene 120.

The user can view the PIP 150 in the visible scene 120 to know what region 140 of interest exists in the invisible scene 130 and in which direction the region 140 of interest is located relative to the visible scene 120, thereby saving time for the user to search for the region 140 of interest in the invisible scene 130.

Figure 2:
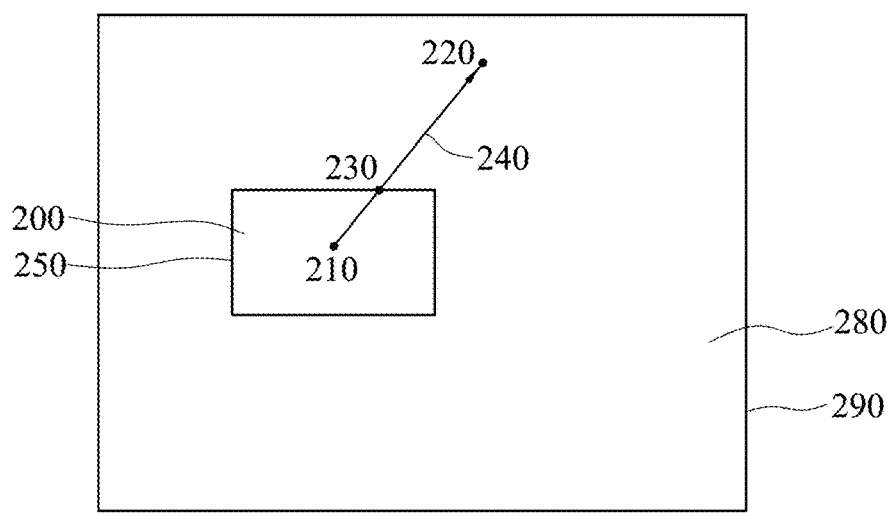
FIG. 2 is a schematic diagram showing presentation of a region of interest of an invisible scene as a PIP in a visible scene according to the present disclosure.

FIG. 2 is a schematic diagram showing presentation of a region of interest of an invisible scene as a PIP in a visible scene according to the present disclosure.

As shown in FIG. 2, in a virtual environment 290 consisting of a visible scene 200 and an invisible scene 280, the visible range of the visible scene 200 is a region from a center 210 to an edge 250 of the visible scene 200, and a region 220 of interest is located in the invisible scene 280.

In an embodiment, when introduced into the visible scene 200 and displayed as a PIP, the region 220 of interest of the invisible scene 280 is displayed at a position along a line 240 connecting the position of the region 220 of the interest and the position of the center 210.

As such, when seeing the PIP at a position 230, the user will know that the region 220 of interest is located along the line 240 and hence can search for the region 220 of interest along the line 240.

In an embodiment, when introduced into the visible scene 200 and displayed as a PIP, the region 220 of interest of the invisible scene 280 is displayed on the edge 250 of the visible scene 200.

As such, when the user wants to search the invisible scene 280 for a plurality of regions of interest, the regions of interest are displayed as corresponding PIPs on the edge 250 of the visible scene 200. Since these PIPs are not presented in the main view region of the visible scene 200 (for example, the region near the center 210), the visual experiences of the user will not be adversely affected.

It should be understood that the presentation of a PIP on the edge 250 of the visible scene 200 includes, but not limited to, the presentation of the entire PIP inside the visible scene 200 (that is, the entire PIP is presented inside the edge 250) or the presentation of a portion of the PIP inside the visible scene 200 (that is, a portion of the PIP falls outside the edge 250 and is not presented inside the visible scene 200).

Figure 3:
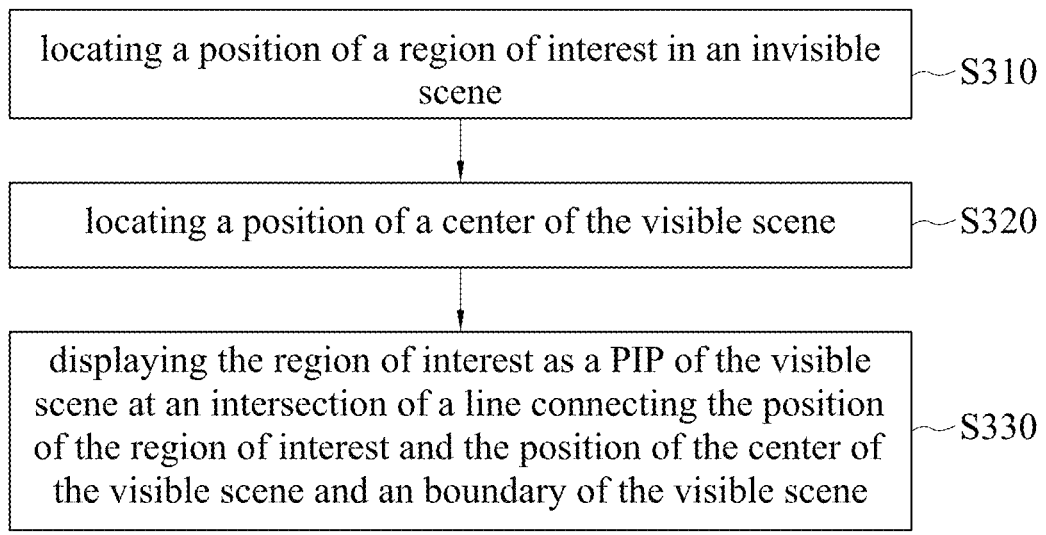
FIG. 3 is a schematic flow diagram showing a method for presenting a region of interest as a PIP in a visible scene according to an embodiment of the present disclosure.

FIG. 3 is a schematic flow diagram showing a method for presenting a region of interest as a PIP in a visible scene according to an embodiment of the present disclosure.

First, at step S310, the region 220 of interest in the invisible scene 280 is located to determine its position in the virtual environment 290. In an embodiment, a center-of-mass coordinate of the region 220 of interest (for example, its longitude and latitude in the virtual environment 290) is used to represent the position of the region 220 of interest in the virtual environment 290.

In an embodiment, the region 220 of interest may be manually chosen and marked and its position in the virtual environment 290 is manually marked and recorded so as to locate the position of the region 220 of interest.

Alternatively, recognition techniques using feature engineering or artificial intelligence such as deep learning may be used to find what regions 220 of interest exist in the invisible scene 280 and locate their positions.

Thereafter, at step S320, the position of the center 210 of the visible scene 200 in the virtual environment 290 is located.

Then, at step S330, the region 220 of interest is displayed as a PIP of the visible scene 200 at an intersection (i.e., position 230) of the line connecting the position of the region 220 of interest and the position of the center 210 of the visible scene 200 and the edge 250 of the visible scene 200.

In an embodiment, the visible scene 200 and the PIP may be projected on a display of an electronic device through a projecting means. The electronic device may be, but not limited to, a desktop computer, a notebook computer, a smart phone and a wearable device.

Further, the visible scene 200 and the PIP may be projected on the display through equirectangular projection, cube mapping, equi-angular cubemapping and so on.

Figure 4:
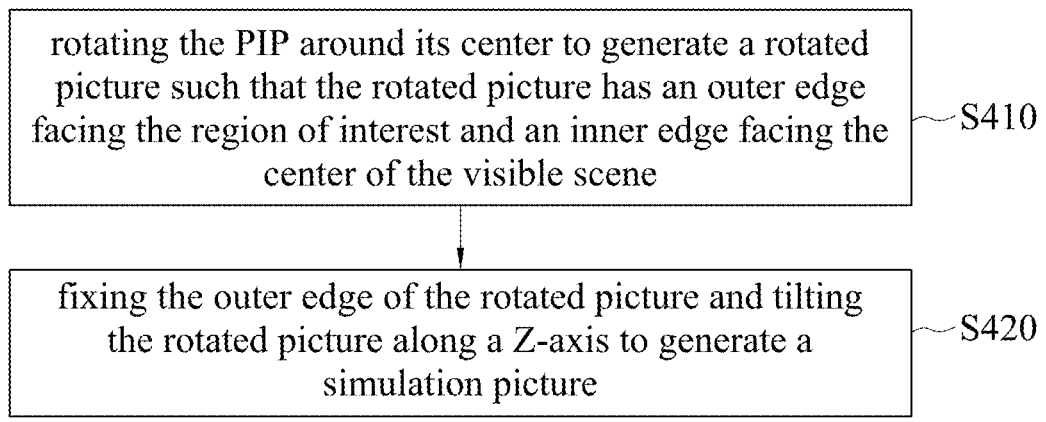
FIG. 4 is a schematic flow diagram showing a method for simulation processing of a PIP in a visible scene according to an embodiment of the present disclosure.

FIG. 4 is a schematic flow diagram showing a method for simulation processing of a PIP in a visible scene according to an embodiment of the present disclosure.

First, at step S410, the PIP at the display position 230 is rotated around its center to generate a rotated picture. In an embodiment, an outer edge of the rotated picture faces the region 220 of interest in the invisible scene 280 and an inner edge of the rotated picture faces the center 210 of the visible scene 200.

In an embodiment, the direction and angle of the rotation may be changed according to the orientation of the region 220 of interest relative to the center 210 of the visible scene 200.

For example, if the region 220 of interest is located to the east, southeast or northeast of the center 210 of the visible scene 200, the PIP may be rotated clockwise (or counterclockwise) around its center to generate the rotated picture. Otherwise, if the region 220 of interest is located to the west, southwest or northwest of the center 210 of the visible scene 200, the PIP may be rotated counterclockwise (or clockwise) around its center to generate the rotated picture.

Thereafter, at step S420, the outer edge of the rotated picture is fixed and then the rotated picture is tilted by a tilting angle $\Phi$ along a Z-axis in the three-dimensional space to generate a simulation picture.

Compared with a PIP that is not processed, the simulation picture presents more 3D spatial information. As such, when experiencing virtual reality, the user has a more realistic spatial experience and captures visual information of the region of interest more easily.

In an embodiment, the tilting angle is varied based on the distance between the region 220 of interest and the center 210 of the visible scene 200.

For example, the longer the distance between the region 220 of interest and the center 210 of the visible scene 200 is, the greater (or the less) the tilting angle becomes.

As such, when viewing a plurality of simulation pictures corresponding to different regions 220 of interest, the user can determine the distances between the regions 220 of the interest and the center 210 of the visible scene 200 according to the tilting angles.

In an embodiment, a maximum angle of the tilting angle may be 105 degrees (maxTilt) and a minimum angle of the tilting angle may be 0 degree (minTilt). Since the titling angle is limited to the range of minTilt to maxTilt, the present disclosure avoids too large a tilting angle that could adversely affect the user's visual experience.

In an embodiment, the tilting angle $\Phi$ can be calculated according to the following equation:

$$\Phi = \text{maxTilt} + (0 - \text{maxTilt}) \times (\text{dist\_max} - \text{dist}) / \text{dist\_max},$$

wherein dist_max represents the distance between the farthest region of interest of the invisible scene 280 and the center 210 of the visible scene 200, and dist represents the distance between the current region of interest and the center 210 of the visible scene 200.

FIGS. 5a to 5d are schematic diagrams showing variation of a visible scene and a PIP when the PIP is simulation processed according to an embodiment of the present disclosure.

Figure 5A:
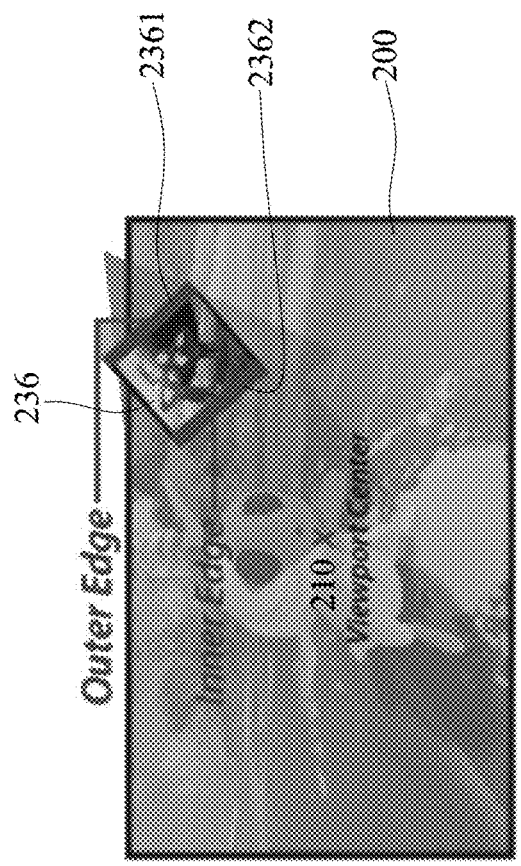
FIGS. 5*a* to 5*d* are schematic diagrams showing variation of a visible scene and a PIP when the PIP is simulation processed according to an embodiment of the present disclosure.

Referring to FIG. 5a, the PIP 235 in the visible scene 200 is located at the intersection of the edge 250 of the visible scene 200 and the line 240 and corresponds to a region of interest (not shown) that is located at a position in the outwardly extending direction of the line 240.

Figure 5B:
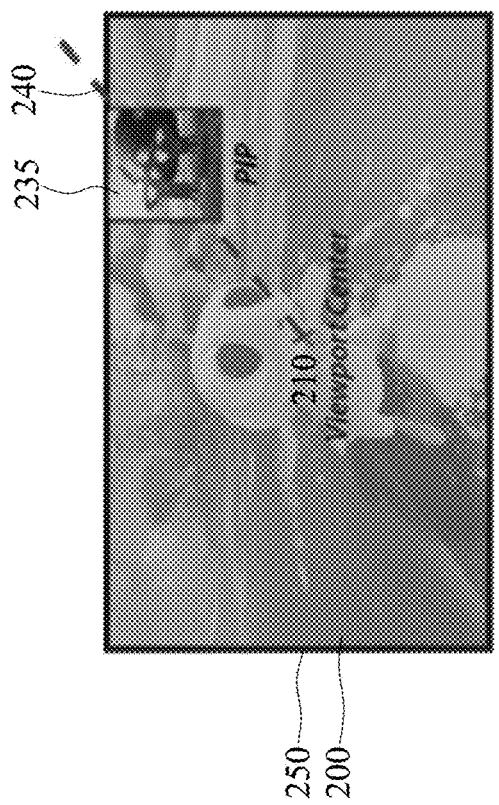

Referring to FIG. 5b, the PIP 235 in the visible scene 200 is processed at step S410 to generate a rotated picture 236. The outer edge 2361 of the rotated picture 236 faces the region of interest outside the visible scene 200 while the inner edge 2362 of the rotated picture 236 faces the center 210 of the visible scene 200.

Figure 5C:
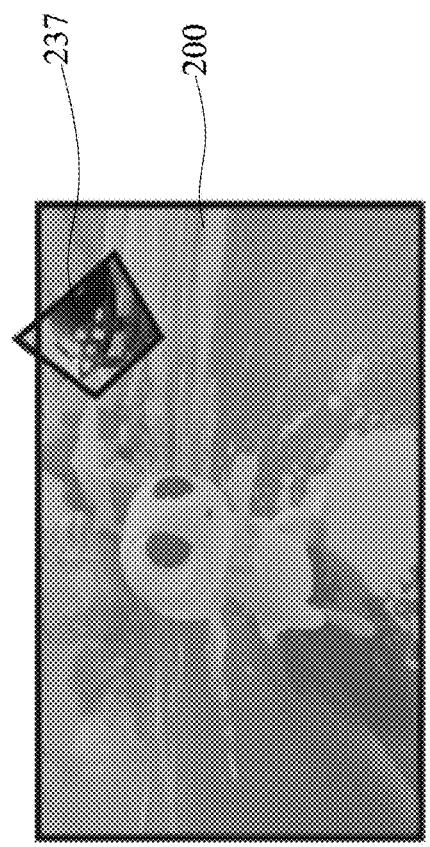

Referring to FIG. 5c, the rotated picture 236 is processed at step S420 to generate a simulation picture 237. $\Phi$ represents the tilting angle along a Z-axis in the three-dimensional space. To facilitate viewing of the spatial effect of the simulation picture 237 generated by tilting the rotated picture 236 along a Z-axis in the three-dimensional space, the viewing angle of the visible scene 200 and the simulation picture 237 are changed by Φ degrees, as shown in FIG. 5c.

Figure 5D:
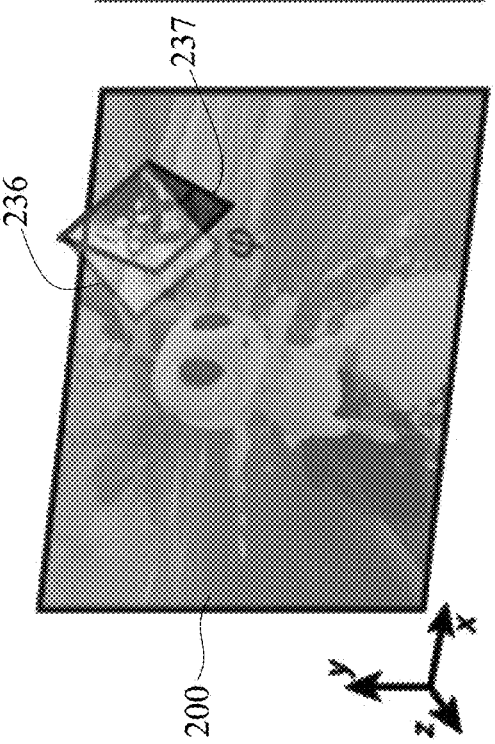

Referring to FIG. 5d, the visible scene 200 and the simulation picture 237 of FIG. 5c are viewed in the original viewing angle.

Figure 6:
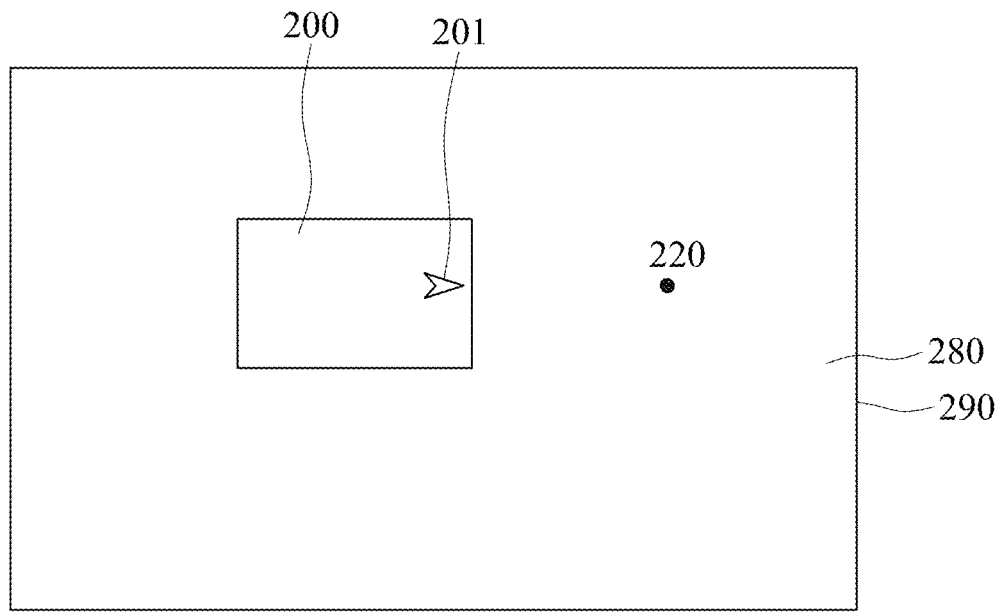
FIG. 6 is a schematic diagram showing application of a guiding symbol in a visible scene for enhancing efficiency of searching for a region of interest according to an embodiment of the present disclosure.

FIG. 6 is a schematic diagram showing application of a guiding symbol in a visible scene for enhancing efficiency of searching for a region of interest according to an embodiment of the present disclosure.

Referring to FIG. 6, if the region 220 of interest is located outside the visible scene 200 (i.e., in the invisible scene 280), a guiding symbol 201 is applied to guide the user toward the region 220 of interest so as to save time.

The number of the guiding symbol 201 may be varied according to the number of the region 220 of interest. For example, if three regions 220 of interest exist in the invisible scene 280, three guiding symbols 201 are displayed in the visible scene 200. If one region 220 of interest is added to (or deleted from) the invisible scene 280, the number of the guiding symbols 201 becomes 4 (or 2).

Figure 7:
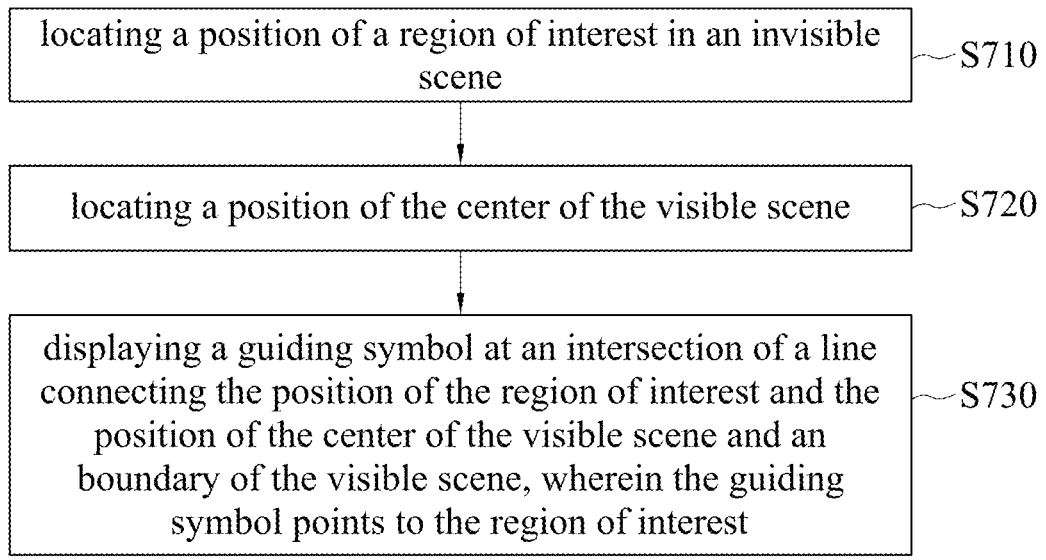
FIG. 7 is a schematic flow diagram showing a method for applying a guiding symbol in a visible scene according to an embodiment of the present disclosure.

FIG. 7 is a schematic flow diagram showing a method for applying a guiding symbol in a visible scene according to an embodiment of the present disclosure. Referring to FIG. 7, steps S710 and S720 are substantially the same as steps S310 and S320 of FIG. 3, respectively, but step S730 is different from S330.

At step S730, a guiding symbol 201 is displayed at an intersection (i.e., position 230) of the line connecting the position of the region 220 of interest and the position of the center 210 of the visible scene 200 and the edge 250 of the visible scene 200. The guiding symbol points to the region 220 of interest.

In an embodiment, an arrow is used as the guiding symbol 201 pointing to the region 220 of interest. Further, the length, width, area and/or shape of the arrow may be used to indicate the distance of the region 220 of interest from the center 210 of the visible scene 200.

For example, a long arrow indicates a long distance between the region 220 of interest and the center 210 of the visible scene 200 and a short arrow indicates a short distance between the region of interest 220 and the center 210 of the visible scene 200. In another embodiment, a wide arrow indicates a long distance between the region 220 of interest and the center 210 of the visible scene 200 and a narrow arrow indicates a short distance between the region of interest 220 and the center 210 of the visible scene 200. In a further embodiment, an arrow with a large area indicates a long distance between the region 220 of interest and the center 210 of the visible scene 200 and an arrow with a small area indicates a short distance between the region of interest 220 and the center 210 of the visible scene 200.

It should be noted that the guiding symbol is not limited to the arrow. In an embodiment, a graphic symbol or a character symbol may be used.

Figure 8A:
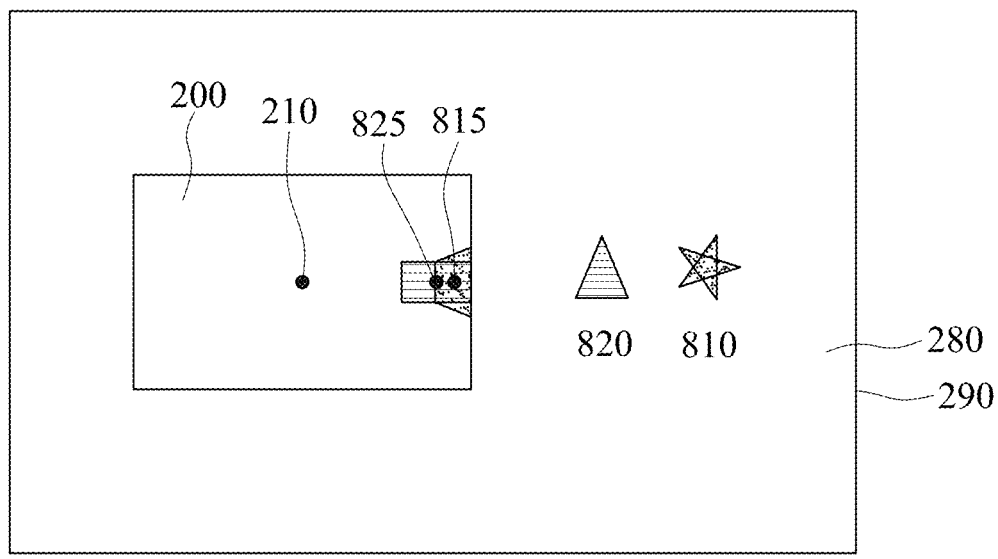
FIGS. 8*a* and 8*b* are schematic diagrams showing separation of partially overlapped PIPs in a visible scene for enhancing efficiency of searching for regions of interest according to an embodiment of the present disclosure.
Figure 8B:
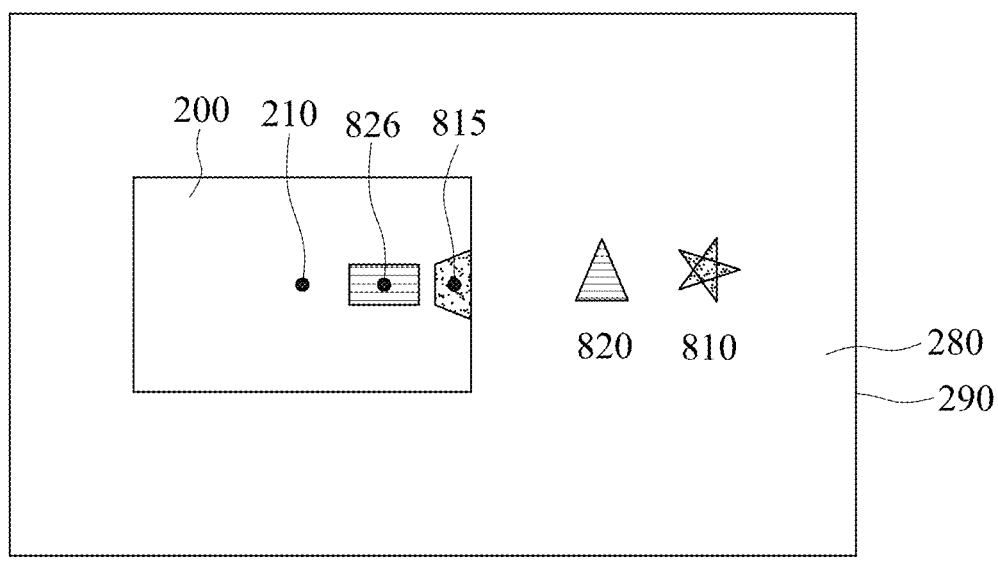

FIGS. 8a and 8b are schematic diagrams showing separation of partially overlapped PIPs in a visible scene for enhancing efficiency of searching for regions of interest according to an embodiment of the present disclosure.

As shown in FIG. 8a, if the regions of interest are a star 810 and a triangle 820, a star PIP corresponding to the star 810 and presented at a location 815 and a triangle PIP corresponding to the triangle 820 and presented at a location 825 are partially overlapped.

As the number of the regions of interest increases, the number of the PIPs in the visible scene increases accordingly and the PIPs may be overlapped. As such, it becomes difficult for the user to capture visual information of the regions of interest such as the orientations of the regions of interests from the overlapped PIPs.

According to the present disclosure, linear interpolation is used to find a position 826 (as shown FIG. 8b) for presenting the triangular PIP, thereby overcoming the overlapping problem and enhancing the efficiency of searching for the regions of interest.

Figure 9:
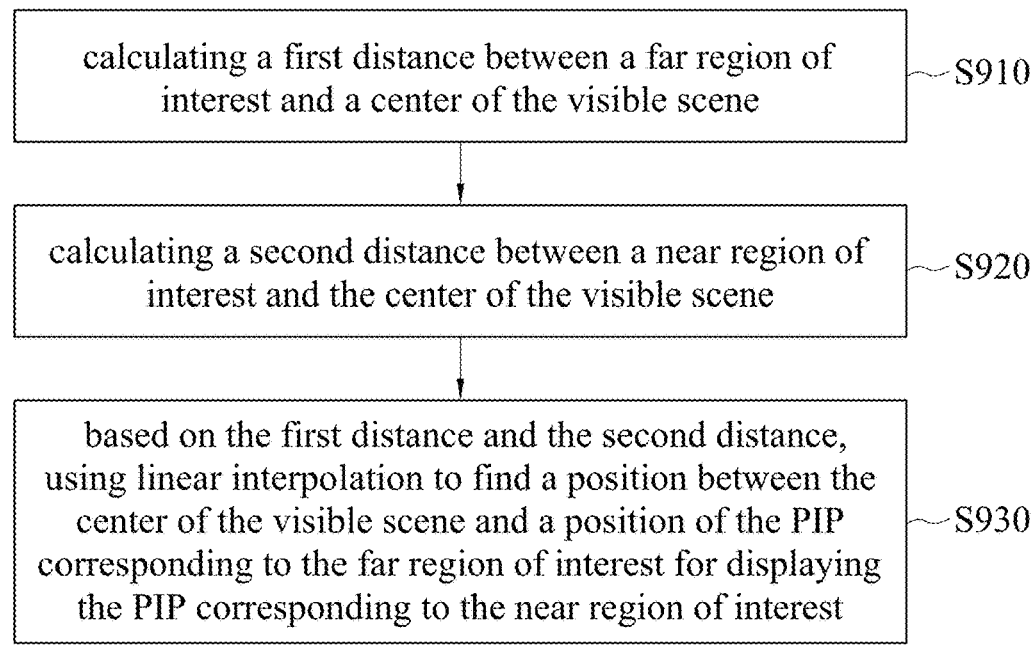
FIG. 9 is a schematic flow diagram showing a method for separating partially overlapped PIPs according to an embodiment of the present disclosure.

FIG. 9 is a schematic flow diagram showing a method for separating partially overlapped PIPs according to an embodiment of the present disclosure.

At step S910, a first distance between a far region of interest such as the star 810 in the invisible scene 280 and the center 210 of the visible scene 200 is calculated.

At step S920, a second distance between a near region of interest such as the triangle 820 in the invisible scene 280 and the center 210 of the visible scene 200 is calculated.

It should be noted that although the first distance is greater than the second distance, the star PIP presented at the position 815 partially overlaps with the triangle PIP presented at the position 825.

At step S930, based on the first distance and the second distance, linear interpolation is used to find a position 826 between the center 210 of the visible scene 200 and the position 815 for displaying the triangle PIP corresponding to the triangle 820 of the invisible scene 280.

For example, the linear interpolation is based on the following equation:

$$\text{pip\_near} = \text{pos\_center} + (\text{pip\_far} - \text{pos\_center}) \times \text{dist\_near} / \text{dist\_far},$$

wherein pip_near represents the position for presenting the PIP corresponding to the region of interest near the center 210, pip_far represents the position for presenting the PIP corresponding to the region of interest far from the center 210, pos_center represents the center 210 of the visible scene 200, dist_near represents the distance of the near region of interest from the center 210, and dist_far represents the distance of the far region of interest from the center 210.

It should be noted that the above equation is used only when the far region of interest and the near region of interest are located in the same direction.

In an embodiment, an area for presenting PIPs may be defined in the visible scene 200 so as to prevent the PIPs from occupying the main view region and adversely affecting the visual experience of the user.

Also, it is ensured that the PIPs are completely presented inside the edge 250 and hence the user captures complete visual information of the regions of interest.

In an embodiment, a maximum distance between a display position and the center 210 is set to be MaxShowDist (for example, 35%, 40%, 45% of the length (width) of the visible scene 200) and a minimum distance between a display position and the center 210 is set to be MinShowDist (for example, 5%, 10%, 15% of the length (width) of the visible scene 200).

In an embodiment, the distance of a region of interest A (not shown) of the invisible scene 280 from the center 210 is dist_max and the distance of the display position pip_max of the corresponding PIP from the center 210 is MaxShowDist. Further, the distance of a region of interest B (not shown) of the invisible scene 280 from the center 210 is dist_min and the distance of the display position pip_min of the corresponding PIP from the center 210 is MinShowDist.

For a region of interest C (not shown) in the same direction as the region A of interest and the region B of interest, the display position of the corresponding PIP thereof can be calculated through the following equation:

$$\text{pip\_candidate}=\text{pip\_min}+(\text{MaxShowDist}-\text{MinShowDist})\times \text{dist\_max}/\text{dist\_candidate}$$

Figure 10:
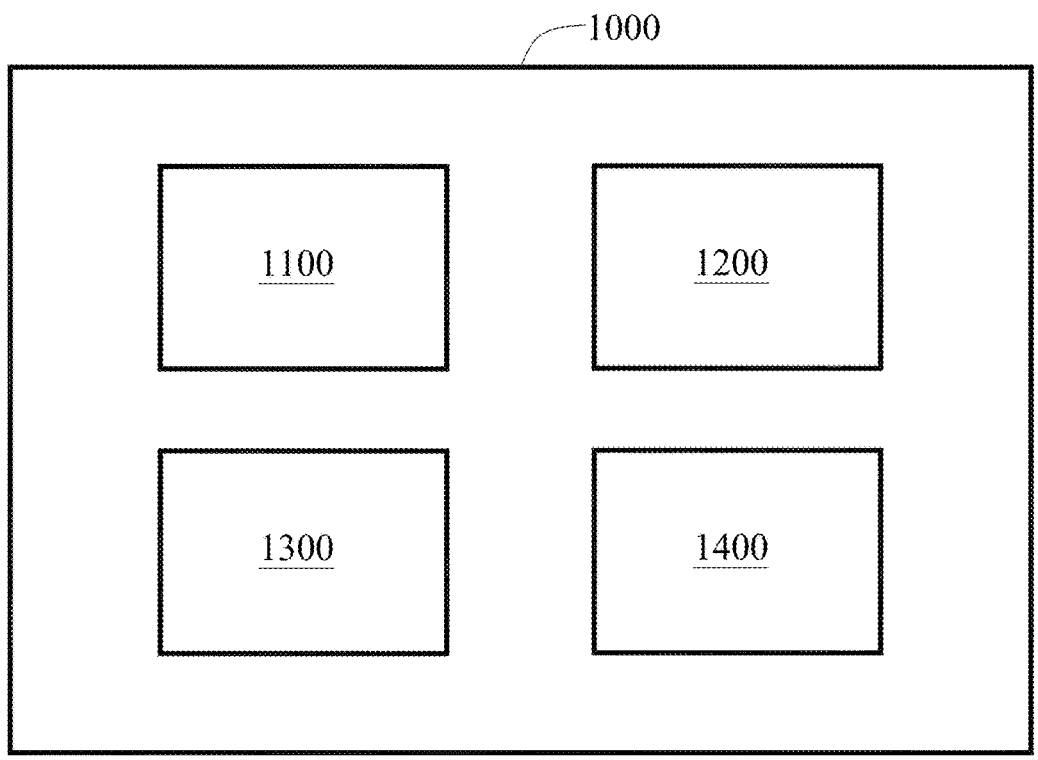
FIG. 10 is a schematic diagram of an electronic device according to an embodiment of the present disclosure.

FIG. 10 is a schematic diagram of an electronic device according to an embodiment of the present disclosure.

As shown in FIG. 10, the electronic device 1000 includes a storage unit 1100, a sensing unit 1200, a computing unit 1300 and a display unit 1400. The electronic device 1000 includes, but not limited to, a desktop computer, a notebook computer, a smart phone or a wearable electronic device.

The storage unit 1100 may be a computer readable memory device. The computer readable storage medium can be implemented via one or more of a volatile computer memory, a non-volatile memory, a hard drive a flash drive, a floppy disk or a compact disk, and a comparable medium. The storage unit 1100 may store computer executable instructions for performing the above-described methods, and data related to the virtual environment 290 such as picture information and position information of the visible scene 200, the invisible scene 280 and the regions 220 of interest.

The sensing unit 1200 detects physical information of the electronic device, including but not limited to the orientation of the electronic device (for example, the electronic device facing east, west, south or north) and the state of the electronic device relative to the horizontal plane (for example, the electronic device having an angle of elevation or depression relative to the horizontal plane). In some embodiments, the sensing unit 1200 can be implemented as an accelerator, a gyroscope and other devices capable of detecting the physical information of the electronic device.

The computing unit 1300 may be implemented in the form of a computer processor, including but not limited to a single core processor, a dual microprocessor, a multi-core processor, AMD's Athlon, Duron and Opeteron processors, and Intel Celeron, Core 2 Duo, Core2 Quad, core i3, core i5 and core i7 processors. The computing unit 1300 controls operation of related hardware and software and executes the computer executable instructions of the storage unit 110 to implement the above-described methods.

The display unit 1400 may be implemented as various physical and/or virtual display devices, including but not limited to a computer screen, a laptop computer screen, a mobile device screen, a PDA screen, a tablet screen, and a display screen of a wearable electronic device. The display unit 1400 may display data related to searching for regions of interest in a virtual environment. For example, the display unit 1400 may display a visible scene and PIPs.

The above-described descriptions of the detailed embodiments are only to illustrate the preferred implementation according to the present disclosure, and it is not to limit the scope of the present disclosure. Accordingly, all modifications and variations completed by those with ordinary skill in the art should fall within the scope of present disclosure defined by the appended claims.

What is claimed is:

1. A method for enhancing efficiency of searching for a region of interest in a virtual environment, wherein the virtual environment is comprised of a visible scene and an invisible scene, the method comprising:
    (1) locating a position of the region of interest in the invisible scene and a position of a center of the visible scene;
    (2) displaying the region of interest as a picture-in-picture (PIP) of the visible scene at an intersection of a line connecting the position of the region of interest and the position of the center of the visible scene and a boundary of the visible scene; and
    (3) projecting the visible scene and the PIP on a display device through a projecting means.

2. The method of claim 1, wherein the position of the region of interest is a center-of-mass coordinate of the region of interest.

3. The method of claim 1 wherein the projecting means is selected from the group consisting of equirectangular projection, cube mapping and equi-angular cubemapping.

4. The method of claim 1, further comprising rotating the PIP around a center thereof to generate a rotated picture such that the rotated picture has an outer edge facing the region of interest and an inner edge facing the center of the visible scene.

5. The method of claim 4, further comprising fixing the outer edge of the rotated picture and tilting the rotated picture by a tilting angle θ along a Z-axis in a three-dimensional space to generate a simulation picture.

6. The method of claim 5, wherein the tilting angle is varied based on a distance between the region of interest and the center of the visible scene.

7. The method of claim 5, wherein a maximum angle of the tilting angle is 105 degrees and a minimum angle of the tilting angle is 0 degree.

8. An electronic device for enhancing efficiency of searching for a region of interest in a virtual environment, comprising:
    a storage unit configured for storing computer readable program codes; and
    a processor configured for executing the computer readable program codes for implementing the method of claim 1.

* * * * *